United States Patent
Zhang

(10) Patent No.: US 12,064,944 B2
(45) Date of Patent: Aug. 20, 2024

(54) SUPPORT PLATE, DISPLAY MODULE AND DISPLAY DEVICE

(71) Applicant: Hubei Yangtze Industrial Innovation Center Of Advanced Display Co., Ltd., Wuhan (CN)

(72) Inventor: Kaikai Zhang, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 17/899,643

(22) Filed: Aug. 31, 2022

(65) Prior Publication Data
US 2023/0405964 A1    Dec. 21, 2023

(30) Foreign Application Priority Data
May 31, 2022    (CN) .......................... 202210609640.7

(51) Int. Cl.
*B32B 3/24* (2006.01)
*B32B 3/02* (2006.01)
*B32B 3/26* (2006.01)

(52) U.S. Cl.
CPC ................ *B32B 3/02* (2013.01); *B32B 3/266* (2013.01); *B32B 2457/20* (2013.01)

(58) Field of Classification Search
CPC ...................................................... B32B 3/266
See application file for complete search history.

(56) References Cited

U.S. PATENT DOCUMENTS

2021/0151697 A1*    5/2021    Cao ..................... H10K 50/841

FOREIGN PATENT DOCUMENTS

| | | |
|---|---|---|
| CN | 110689813 A | 1/2020 |
| CN | 110992828 A | 4/2020 |
| CN | 11171 0245 A | 9/2020 |
| CN | 112002230 A | 11/2020 |
| CN | 112164318 A | 1/2021 |
| CN | 112396963 A | 2/2021 |
| CN | 113129752 A | 7/2021 |
| CN | 113540191 A | 10/2021 |
| CN | 112002230 B | 11/2021 |
| CN | 113 88 8978 A | 1/2022 |
| WO | 20221 05539 A1 | 5/2022 |

OTHER PUBLICATIONS

The First Office Action for CN Application No. 20221 06096 40.7, dated Mar. 22, 2023, 9 pages.

* cited by examiner

*Primary Examiner* — William P Watkins, III
(74) *Attorney, Agent, or Firm* — East IP P.C.

(57) ABSTRACT

The present application discloses a support plate, a display module and a display device. The support plate includes a bending region, the bending region can be bent around a first direction, the bending region includes a plurality of repeating units, and the repeating unit includes a support body and two stress-releasing holes formed in the support body, and the two stress-releasing holes are arranged to be spaced from each other; in the same repeating unit, each of the two stress-releasing holes is L-shaped, and angles of the two stress-releasing holes are arranged opposite to each other. The support plate provided by the present application can achieve both the support performance and the bending performance.

18 Claims, 17 Drawing Sheets

SUPPORT PLATE, DISPLAY MODULE AND DISPLAY DEVICE

CROSS REFERENCE TO RELATED APPLICATION

This application claims priority to Chinese Patent Application No. 202210609640.7, filed May 31, 2022, which is hereby incorporated by reference in its entirety.

TECHNICAL FIELD

The present application relates to the technical field of display, and in particular relates to a support plate, a display module and a display device.

BACKGROUND

In a prior art, a folding display device includes a flexible display panel and a support plate for supporting the flexible display panel. The support plate includes a bending region, and the bending area of the support plate has a problem that it is difficult to have both the support performance and the bending performance.

SUMMARY

The embodiments of the present application provides a support plate, a display module and a display device. The support plate provided by the present application can achieve both the support performance and the bending performance.

An embodiment in a first aspect of the embodiments of the present application provides a support plate, including:
- a bending region, in which the bending region can be bent around a first direction, the bending region includes a plurality of repeating units, and the repeating unit includes a support body and two stress-releasing holes formed in the support body, and the two stress-releasing holes are arranged to be spaced from each other;
- in the same repeating unit, each of the two stress-releasing holes is L-shaped, and angles of the two stress-releasing holes are arranged opposite to each other.

The embodiment in a second aspect of the present application further provides a display module, including a flexible display panel and the support plate provided in the first aspect; the support plate is arranged at a side of the flexible display panel away from a light-emitting face.

The Embodiment in a third aspect of the present application further provides a display device, including the display module provided in the second aspect of the present application.

The support plate provided by the present application includes the bending region, the bending region includes the plurality of repeating units, and one of the repeating units includes the support body and two stress-releasing holes, and the support body can be used to support, so that the support plate can be used to support the flexible display panel. Optionally, the support plate 1 may be located at a side of the flexible display panel away from the light-emitting face. The stress-releasing holes can be used to release a stress. When the bending region is bent, the stress-releasing hole can release a part of the stress, so that the bending performance of the bending region can be better. In the same repeating unit, two stress-releasing holes are arranged to be spaced from each other, each of the two stress-releasing holes is L-shaped, and the angles of the two stress-releasing holes are arranged opposite to each other, so that in the repeating unit, the support body can meander around the stress-releasing holes. A part of the support body 101 located between the two L-shaped stress-releasing holes is Z-shaped. A Z-shaped region of the support body is not easy to rotate in the case that the support plate is bent and subjected to a tensile force, which can improve the torsion resistance during the bending process, so that the bending-resisting strength of the bending region can be further reduced under the premise of taking into account the support force.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

DETAILED DESCRIPTION

The features and exemplary embodiments of various aspects of the present application will be described in detail below. In the following detailed description, many specific details are proposed in order to provide a comprehensive understanding of the present application. However, it is obvious to those skilled in the art that the present application can be implemented without some of these specific details. The following description of the embodiments is merely to provide a better understanding of the present application by showing examples of the present application.

It shall be noted that, in this context, relational terms such as first and second are merely used to distinguish one entity or operation from another entity or operation, and do not necessarily require or imply any such actual relationship or order between the entities or operations. Further, the term "comprise", "include" or any other variations thereof is intended to encompass a non-exclusive inclusion, such that a process, method, article, or device including a plurality of elements includes not only these elements but also other elements not listed, or elements that are inherent to such process, method, article or device. Without more limitations, an element that is defined by an expression "comprises . . . " does not exclude other identical elements in the process, method, article, or device comprising this element.

In a prior art, a folding display device includes a flexible display panel and a support plate. The support plate is located at the side of the display panel away from a light-emitting face, and is used for supporting the flexible display panel. After research, the inventor found that the support plate includes a bending region, and the support plate is generally made of metal material, and the bending performance of the bending region is poor during the bending process. In a design of the prior art, a part of region in the bending region may be removed, but at this time, the support performance of the bending region become poor. Therefore, the support plate has the problem that it is difficult to have both the support performance and the bending performance. Based on the research on the above-mentioned problem, the inventor provides a support plate, a display module and a display device, so as to take into account the support performance and the bending performance of the support plate.

In order to understand the present application better, the support plate, the display module and the display device according to the embodiments of the present application will be described in detail below with reference to FIG. 1 to FIG. 22.

Figure 1:
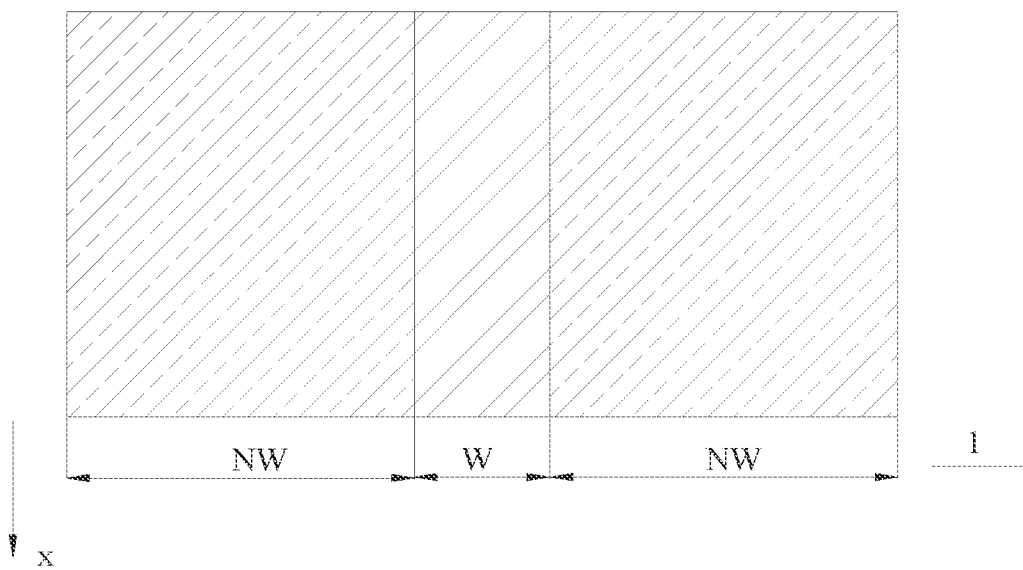
FIG. 1 shows a top view of a support plate provided by an embodiment of the present application.
Figure 2:
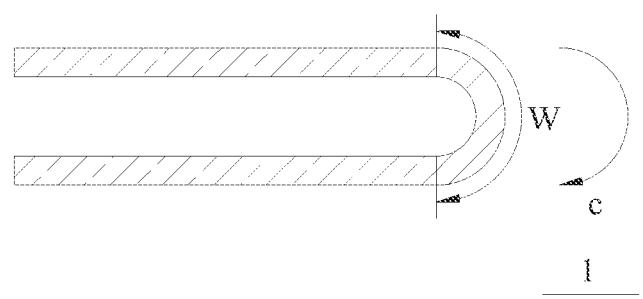
FIG. 2 shows a side view of a support plate provided in an embodiment of the present application in a bent state.
Figure 3:
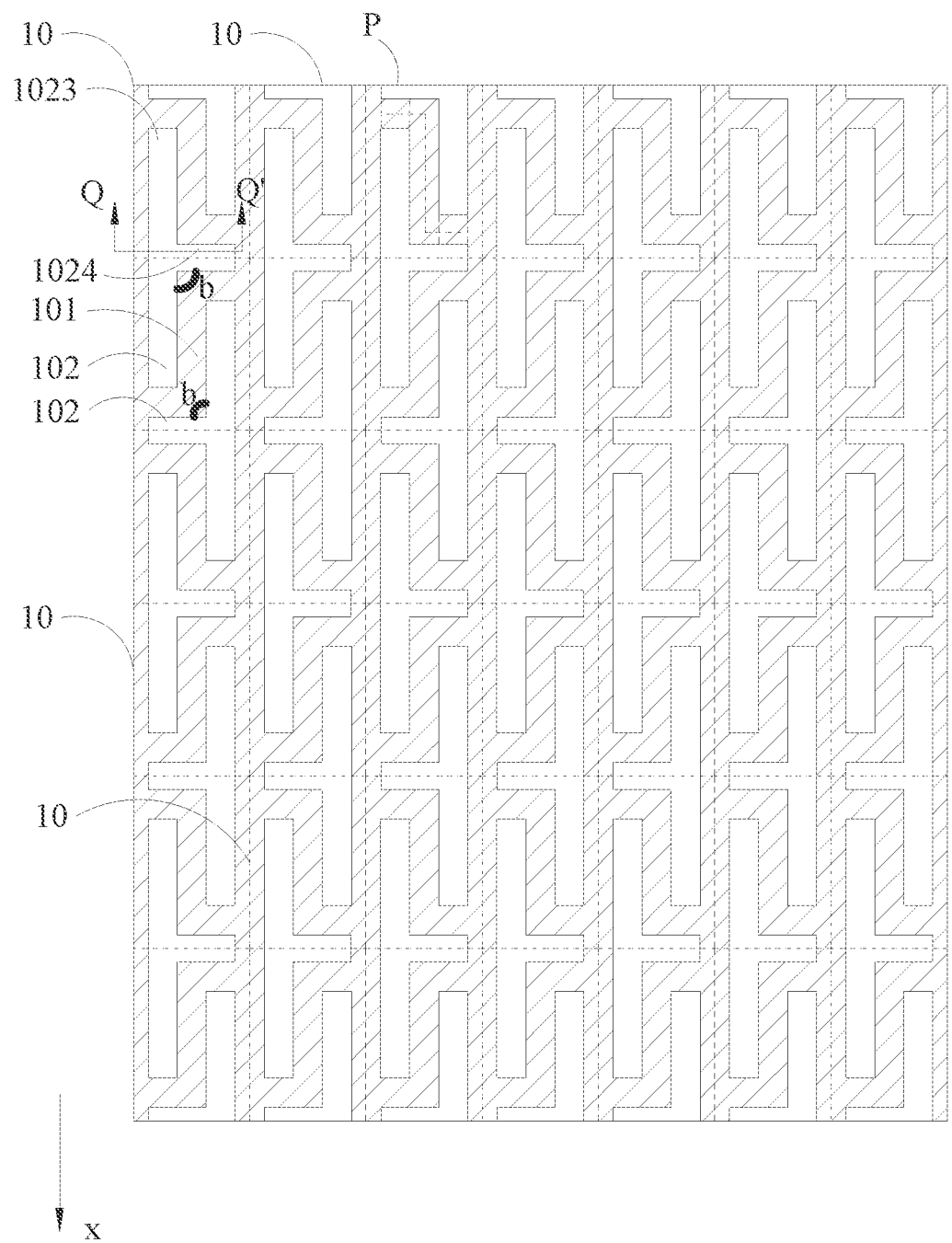
FIG. 3 shows an enlarged view of a region W in FIG. 1.
Figure 4:
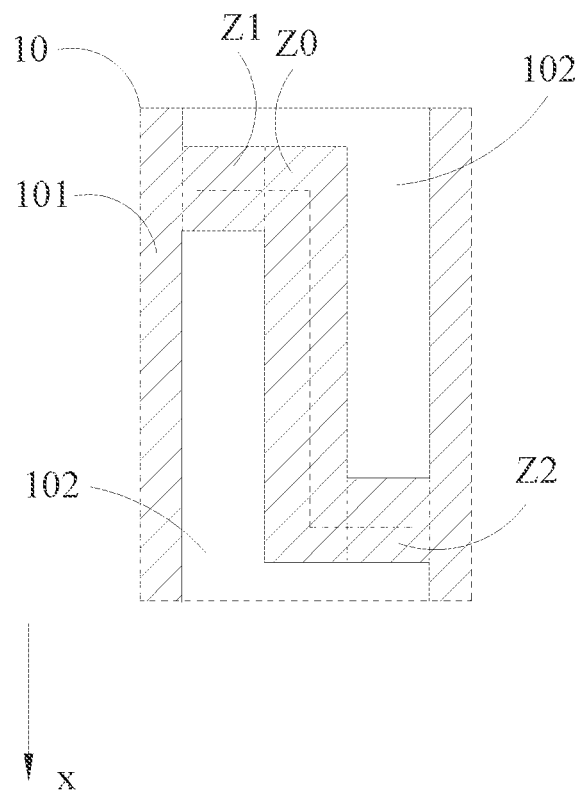
FIG. 4 shows an enlarged view of a region P in FIG. 3.

FIG. 1 shows a top view of a support plate provided by an embodiment of the present application, FIG. 2 shows a side view of a support plate provided in an embodiment of the present application in a bent state, FIG. 3 shows an enlarged view of a region W in FIG. 1, and FIG. 4 shows an enlarged view of a region P in FIG. 3.

Referring to FIG. 1 to FIG. 4, an embodiment of the present application provides a support plate 1, including a non-bending region NW and a bending region W. The bending region W can be bent around a first direction x, the bending region W includes a plurality of repeating units 10, the repeating unit 10 includes a support body 101 and two stress-releasing holes 102 formed in the support body 101, and the two stress-releasing holes 102 are arranged to be spaced from each other. In the same repeating unit 10, each of the two stress-releasing holes 102 is L-shaped, and angles b of the two stress-releasing holes 102 are arranged opposite to each other.

The support plate 1 provided by the present application includes the bending region W. The bending region W includes the plurality of repeating units 10, and the repeating unit 10 includes the support body 101 and two stress-releasing holes 102. The support body 101 can be used to support, so that the support plate 1 can be used to support the flexible display panel. Optionally, the support plate 1 may be located at a side of the flexible display panel away from a light-emitting face. When the bending region W is bent, the stress-releasing hole 102 can release a part of the stress, so that the bending performance of the bending region W can be better. In the same repeating unit 10, two stress-releasing holes 102 are arranged to be spaced from each other, each of the two stress-releasing holes 102 is L-shaped, and the angles b of the two stress-releasing holes 102 are arranged opposite to each other, so that in each of the repeating units 10, the support body 101 can meander around the stress-releasing holes 102. A part of the support body 101 located between the two L-shaped stress-releasing holes 102 is Z-shaped. During the bending process, the support body 101 is subjected to a tensile force in a tangential direction of a bending direction. At this time, as shown in FIG. 2, FIG. 3 and FIG. 4, since the part of the support body 101 located between the two L-shaped stress-releasing holes 102 is Z-shaped, in a region of the Z-shaped support body 101, when a Z0 (i.e., a part of the Z-shaped support body 101 extending in the first direction x) is subjected to the tensile force in the tangential direction of the bending direction, the Z0 has a rotation trend around the first direction x. Due to the existence of ends of a Z1 and a Z2 (i.e., a part of the Z-shaped support body 101 where an extending direction intersects with the first direction x), the Z0 can be fixed on both sides of the Z0, the rotation trend of the Z0 around the first direction x can be suppressed. Therefore, the Z0 is not easy to rotate in the case that the support plate 1 is bent and subjected to the tensile force, which can improve the torsion resistance during the bending process, so that the bending-resisting strength of the bending region can be further reduced under the premise of taking into account the support force.

Specifically, the material of the support plate 1 can be made of steel, or made of other materials with both the support performance and the bending performance, which is not specifically restricted in the present application.

In a feasible embodiment, the shape and the size of the two L-shaped stress-releasing holes 102 in each of the repeating units 10 may be the same or different. When the shape and the size of the two L-shaped stress-releasing holes 102 in each of the repeating units 10 are the same, the two L-shaped stress-releasing holes 102 may be arranged in the central symmetry.

It should be noted that FIG. 1 and FIG. 2 show that the support plate 1 includes one bending region W. In other embodiments, the support plate 1 may further include two or even more bending regions W, which is not restricted in the present application. FIG. 1 merely shows that the support plate 1 and the bending region W are in a shape of rectangle. In other embodiments, the support plate 1 and the bending region W may also be other shapes, which may be adopted according to the actual conditions, which are not restricted in the present application. FIG. 1 merely shows that the bending region W is located in a central region of the support plate for illustration. In other embodiments, the bending region W is not restricted to being located in the central region of the support plate 1, and can be adopted according to the actual situations, which is not restricted in the present application. FIG. 3 shows the enlarged view of the bending region W in FIG. 1. The number, size and the like of the repeating units in FIG. 3 are merely for illustration, and can be adopted according to the actual situations, which is not restricted in the present application.

Figure 5:
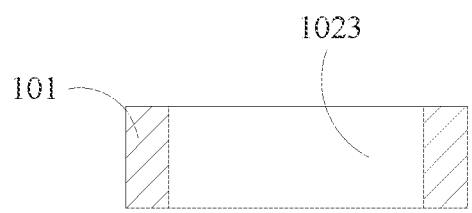
FIG. 5 shows a sectional schematic view in a line Q-Q' in FIG. 3.
Figure 6:
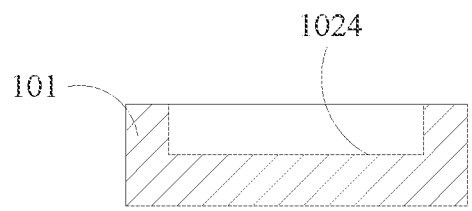
FIG. 6 shows another sectional schematic view in a line Q-Q' in FIG. 3.
Figure 7:
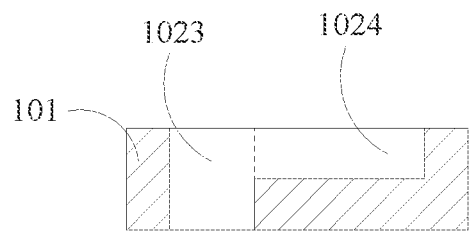
FIG. 7 shows another sectional schematic view in a line Q-Q' in FIG. 3.

FIG. 5 shows a sectional schematic view in a line Q-Q' in FIG. 3, FIG. 6 shows another sectional schematic view in the line Q-Q' in FIG. 3, and FIG. 7 shows another sectional schematic view in the line Q-Q' in FIG. 3.

In a feasible embodiment, as shown in FIG. 3 to FIG. 7, the stress-releasing holes 102 include blind holes 1024 and/or through holes 1023.

In the above embodiment, as shown in FIG. 5, the stress-releasing holes 102 include the through holes 1023 penetrating through the support body 101 in a thickness direction of the support body 101, and/or as shown in FIG. 6, the stress-releasing holes 102 include the blind holes 1024 partially penetrating the support body 101 in the thickness direction of the support body 101. Specifically, the stress-releasing holes 102 can be the through holes 1023 or the blind holes 1024; alternatively, as shown in FIG. 7, a part of the stress-releasing holes 102 may be the through holes 1023 and the other part of the stress-releasing holes may be the blind holes 1024, which is not particularly restricted in the present application.

The stress-releasing holes 102 adopting the through holes 1023 can improve the bending-resisting performance of the support plate 1; the stress-releasing holes 102 adopting the blind holes 1024 can improve the bending-resisting performance of the support plate 1 while taking into account the support performance, which can be selected according to the actual situations, which is not specifically restricted in the present application.

Figure 8:
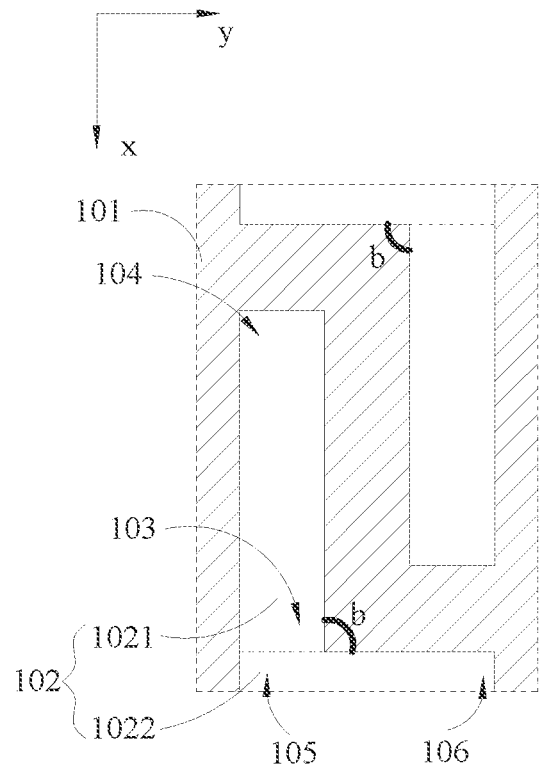
FIG. 8 shows a schematic structural view of a repeating unit in a support plate provided in an embodiment of the present application.

FIG. 8 shows a schematic structural view of the repeating unit in the support plate provided in an embodiment of the present application.

In a feasible embodiment, as shown in FIG. 7 and FIG. 8, each of the two stress-releasing holes 102 in the same repeating unit 10 includes a first sub-section 1021 extending in the first direction x and a second sub-section 1022 extending in a second direction y, and the first direction x and the second subsection direction y intersect with each other.

Specifically, the first direction x and the second direction y may or may not be perpendicular to each other, which is not particularly restricted in the present application. When the first direction x and the second direction y are perpendicular to each other, the actual stress-releasing requirements can be met better during the bending process. During the bending process, the bending region W is bent around the first direction x, so that there is a stress in the bending direction; the first sub-section 1021 extends in the first direction x, so that an extrusion stress of a part located at a bending inner side in the extrusion process can be released during the bending process; herein, the bending direction is a direction of bending around the first direction x. The second sub-section 1022 extends in the second direction y, and the second direction y is a bending direction when the bending region W is bent, so that the second sub-section 1022 can take on more stress-releasing effects in the bending direction.

Specifically, the first sub-section 1021 can be arranged as the through hole 1024 to take on more stress; the second sub-section 1022 can be arranged as the blind hole, so as to take on more stress-releasing effect in the bending direction c and ensure the support effect.

In the above embodiment, each of the stress-releasing holes 102 includes the first subsection 1021 extending in the first direction x and the second subsection 1022 extending in the second direction y, so that each of the stress-releasing hole 102 is L-shaped. The angle b between the first sub-section 1021 and the second sub-section 1022 is the angle b of each of the stress-releasing holes 102. The first sub-section 1021 extends in the first direction x, so that the bending stress on the bending region W can be reduced during the bending process of the bending region W around the first direction x, so as to increase the bending performance of the bending region W.

Herein, the first sub-section 1021 includes a first end 103 and a second end 104, the second sub-section 1022 includes a third end 105 and a fourth end 106, and the first end 103 of each of the stress-releasing holes 102 communicates with the third end 105 of the second sub-section 1022, thereby forming the L-shaped stress-releasing holes 102. In the L-shaped stress-releasing holes 102, the first end 103 of the first sub-section 1021 communicates with the third end 105 of the second sub-section 1022, which can make a distance between the first sub-section 1021 and the second sub-section 1022 become closer; more L-shaped stress-releasing holes 102 can be arranged on a unit length, so that the capability of the bending region W to release the stress can be further improved. In the same repeating unit 10, in the first direction x, the second end 104 of any one of stress-releasing holes 102 is located at the side of the first end 103 of the stress-releasing hole 102 facing to the second sub-section 1022 of another stress-releasing hole 102; in the second direction y, the fourth end 106 of any one of stress-releasing holes 102 is located at the side of the third end 103 of the stress-releasing hole 102 facing to the first sub-section 1021 of another stress-releasing hole 102. Therefore, the angles b of the two L-shaped stress-releasing holes 102 in each repeating unit 10 are opposite to each other, and the support body 101 between the two stress-releasing holes 102 is arranged to be bent to improve the torsion-resisting performance of the bending region W.

It should be noted that the drawings merely show that b is 90° for illustration, that is, the first sub-section 1021 and the second sub-section 1022 are perpendicular to each other. In other embodiments of the present application, the angle b between the first sub-section 1021 and the second sub-section 1022 may be an acute angle or an obtuse angle, which is not restricted in the present application.

In a feasible embodiment, as shown in FIG. 8, in the same repeating unit 10, projections of two first sub-sections 1021 in the second direction y at least partially overlap with each other, and/or projections of two second sub-sections 1022 in the first direction x at least partially overlap with each other.

In the above embodiment, positions of the two stress-releasing holes 102 in the repeating unit 10 are more compact, so that after adjusting the size of the repeating unit 10 according to the distribution of the stress-releasing holes 102, there are more stress-releasing holes 102 in the bending region W, the stress-releasing capability of the bending region W can be further improved, and the bending performance of the bending region W can be better.

Figure 9:
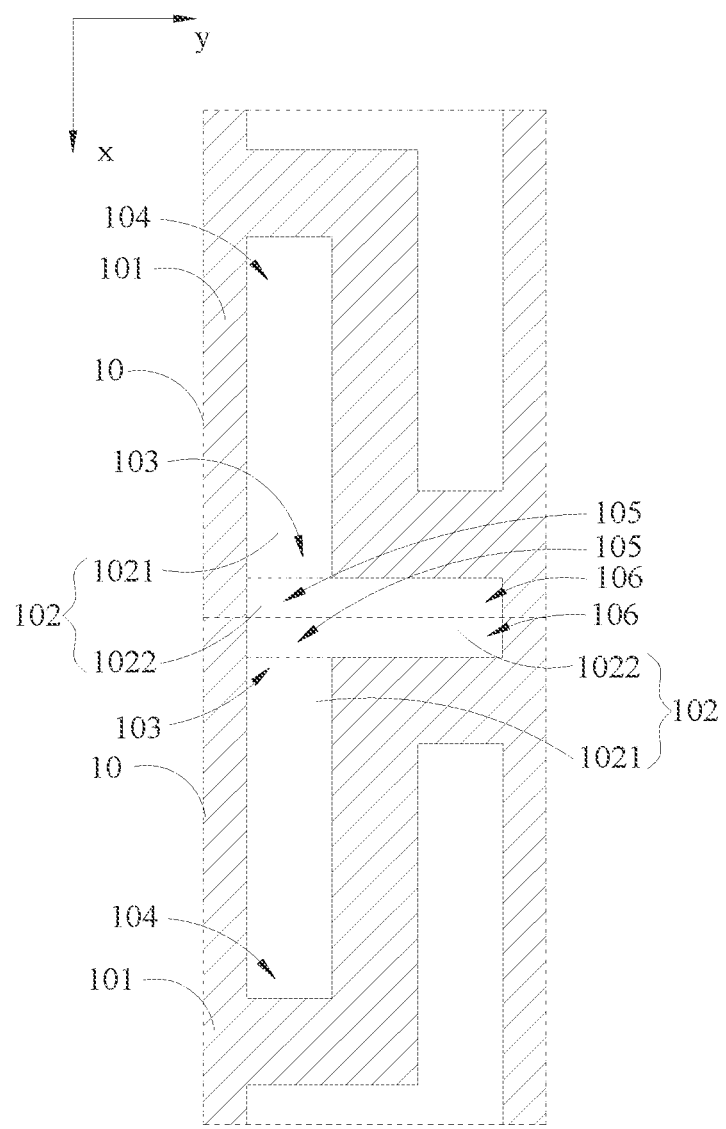
FIG. 9 shows a schematic structural view of two repeating units in a support plate provided in an embodiment of the present application.

FIG. 9 shows a schematic structural view of two repeating units in the support plate provided in an embodiment of the present application.

In a feasible embodiment, as shown in FIG. 3 and FIG. 9, the support bodies 101 of the plurality of repeating units 10 in the bending region W are arranged continuously, in at least two adjacent repeating units 10 in the first direction x, one of the stress-releasing holes 102 in one of the repeating units 10 communicates with one of the stress-releasing holes 102 in another repeating unit 10.

In the above embodiment, by arranging the support bodies 101 of the plurality of repeating units 10 in the bending region W continuously, the support bodies 101 can provide the stable support and have the high flatness. In at least two adjacent repeating units 10 in the first direction x, one the stress-releasing holes 102 in one of the repeating units 10 communicates with one stress-releasing hole 102 in another repeating unit 10, so that the two stress-releasing holes 102 are communicated with each other to form a stress-releasing region with a larger area, so as to increase an area ratio of the stress-releasing holes 102 to the bending region W, thereby further improving the bending performance of the bending region W. At the same time, the two stress-releasing holes 102 are communicated to each other, so that a distance between the two stress-releasing holes 102 can be made closer, and more L-shaped stress-releasing holes 102 can be arranged per unit length, so that the stress-releasing capability of the bending region W can be further improved.

In a feasible embodiment, as shown in FIG. 9, edges of the second sub-sections 1022 of the two stress-releasing holes 102 communicating with each other in the first direction x at least partially overlap with each other.

Specifically, FIG. 9 only shows the case that the two second sub-sections 1022 of the two connected stress-releasing holes 102 are completely coincident in the first direction x. In other embodiments, in the first direction x, the two second sub-sections 1022 of the two connected stress-releasing holes 102 may only partially overlap with each other, which is not particularly restricted in the present application.

In the above embodiment, the two stress-releasing holes 102 communicated with each other in the first direction x may be communicated through the second sub-sections 1022 of the two stress-releasing holes 102, so that the two stress-releasing holes 102 arranged in the first direction x can be communicated with each other to form the stress-releasing region with a larger area. In addition, the stress-releasing region has a wider distribution range in the first direction x, so that when the bending region W is bent around the first direction x, the extrusion stress in the bending direction can be further released, and the bending performance of the bending region W can be better. In a feasible embodiment, as shown in FIG. 9, in a thickness direction of the support bodies 101, a shape of the two stress-releasing holes 102 communicating with each other in the first direction x is a T-shape.

In the above embodiment, in the first direction x, projections of first sub-sections of the two stress-releasing holes 102 communicating with each other in the first direction x overlap with each other, projections of second sub-sections in the first direction x overlap with each other, projections of the third ends 105 of the two second sub-sections 1022 communicated with each other in the first direction x overlap with each other, projections of the fourth ends 106 in the first direction x overlap with each other, so that the T-shape is formed.

In the above embodiment, two first sub-sections are arranged in the first direction x, so that the two stress-releasing holes 102 communicated with each other in the first direction x are symmetrically distributed in a direction perpendicular to the first direction x, and the stress distribution can be made more uniform during the bending process.

Figure 10:
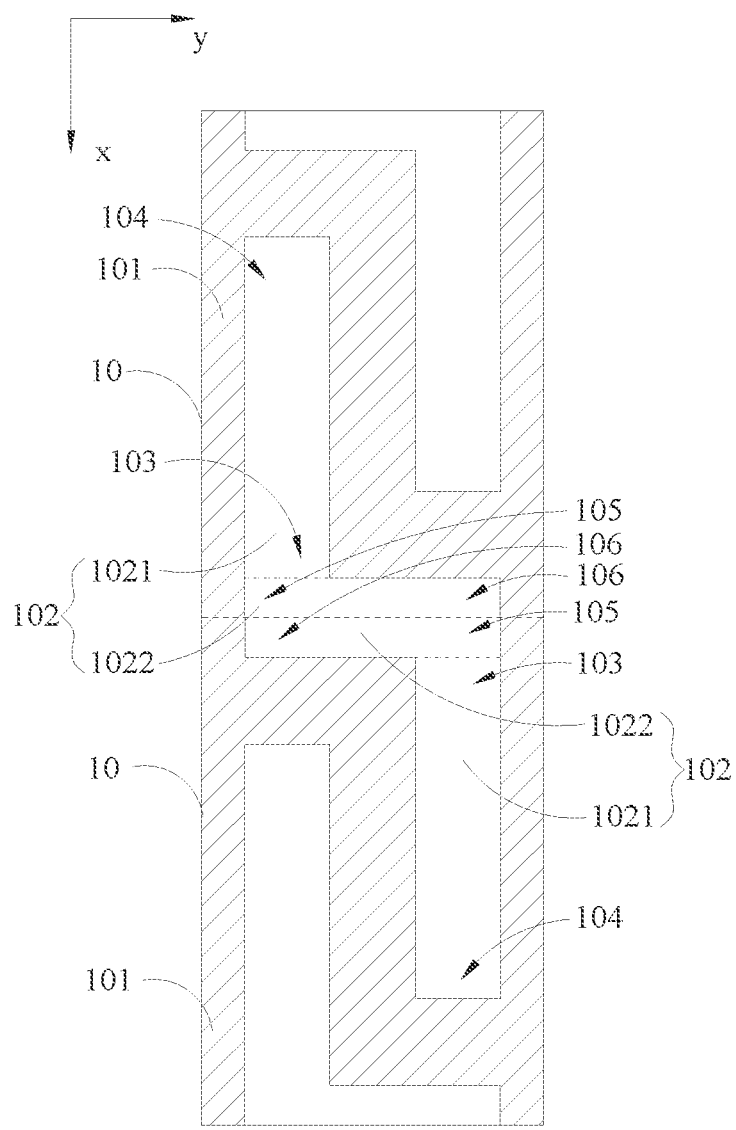
FIG. 10 shows a schematic structural view of another support plate provided by an embodiment of the present application.

FIG. 10 shows a schematic structural view of another support plate provided by an embodiment of the present application.

In another feasible embodiment, as shown in FIG. 10, in the thickness direction of the support bodies 101, a shape of the two stress-releasing holes 102 communicating with each other in the first direction x is a Z-shape.

In the above embodiment, in the first direction x, projections of the first sub-sections 1021 of the two stress-releasing holes 102 communicating with each other in the first direction x do not overlap with each other, projections of section sub-sections 1022 in the first direction x overlap with each other; in two second sub-sections 1022 communicated with each other, a projection of the third end 105 of one of the second sub-sections 1022 and a projection of the fourth end 106 of the other second sub-section 1022 overlap with each other in the first direction x, and the projection of the fourth end 106 and a projection of the third end 105 of the other second sub-section 1022 overlap with each other in the first direction x, so that the Z-shape is formed.

In another feasible embodiment, the projections of the first sub-sections 1021 in the two stress-releasing holes 102 communicated with each other in the first direction x may also be arranged to partially overlap with each other in the first direction x, and the projections of the second sub-sections 1022 overlap with each other in the first direction x, which is not particularly restricted in the present application.

Figure 11:
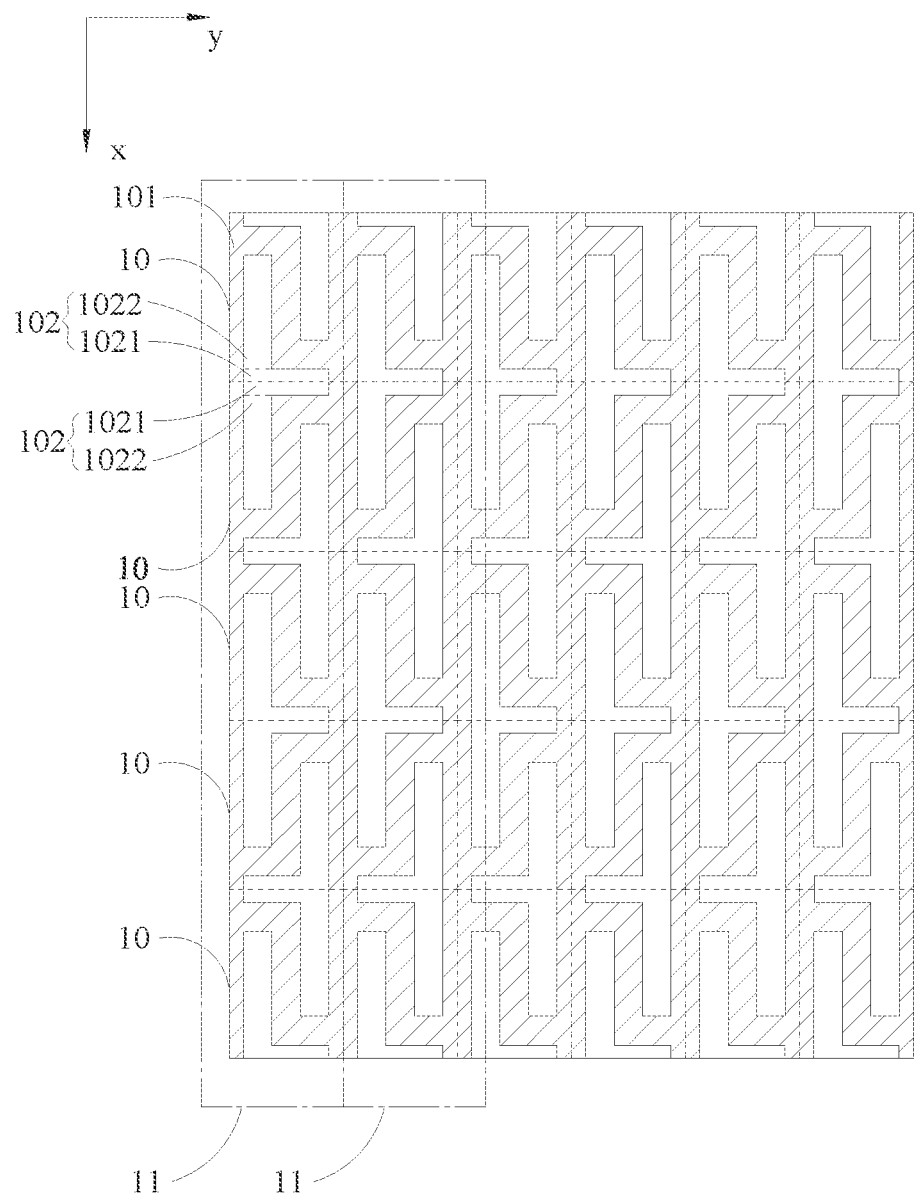
FIG. 11 is a schematic structural view of a bending region in another support plate provided by an embodiment of the present application.

FIG. 11 is a schematic structural view of a bending region in another support plate provided by an embodiment of the present application.

In a feasible embodiment, as shown in FIG. 11, the bending region W includes a plurality of repeating unit groups 11, and the repeating unit group 11 includes the plurality of the repeating units 10 arranged in the first direction x. The adjacent repeating unit groups 11 in the second direction y are arranged in an array, so that the distribution of the stress-releasing holes 102 is more uniform in the second direction y, and the stress distribution can be more uniform during the bending process.

Specifically, as shown in FIG. 11, when the shape of the two adjacent stress-releasing holes 102 in the first direction x is T-shaped in the thickness direction of the support bodies 101, in the second direction y, two adjacent T-shapes are arranged in a same direction. According to this arrangement, in any two adjacent T-shapes in the second direction y, the distances between the two first sub-sections 1021 arranged in the second direction y are the same, so that the T-shaped distribution in the bending region W can be more uniform, and the stress distribution in the bending region W can be more uniform.

Figure 12:
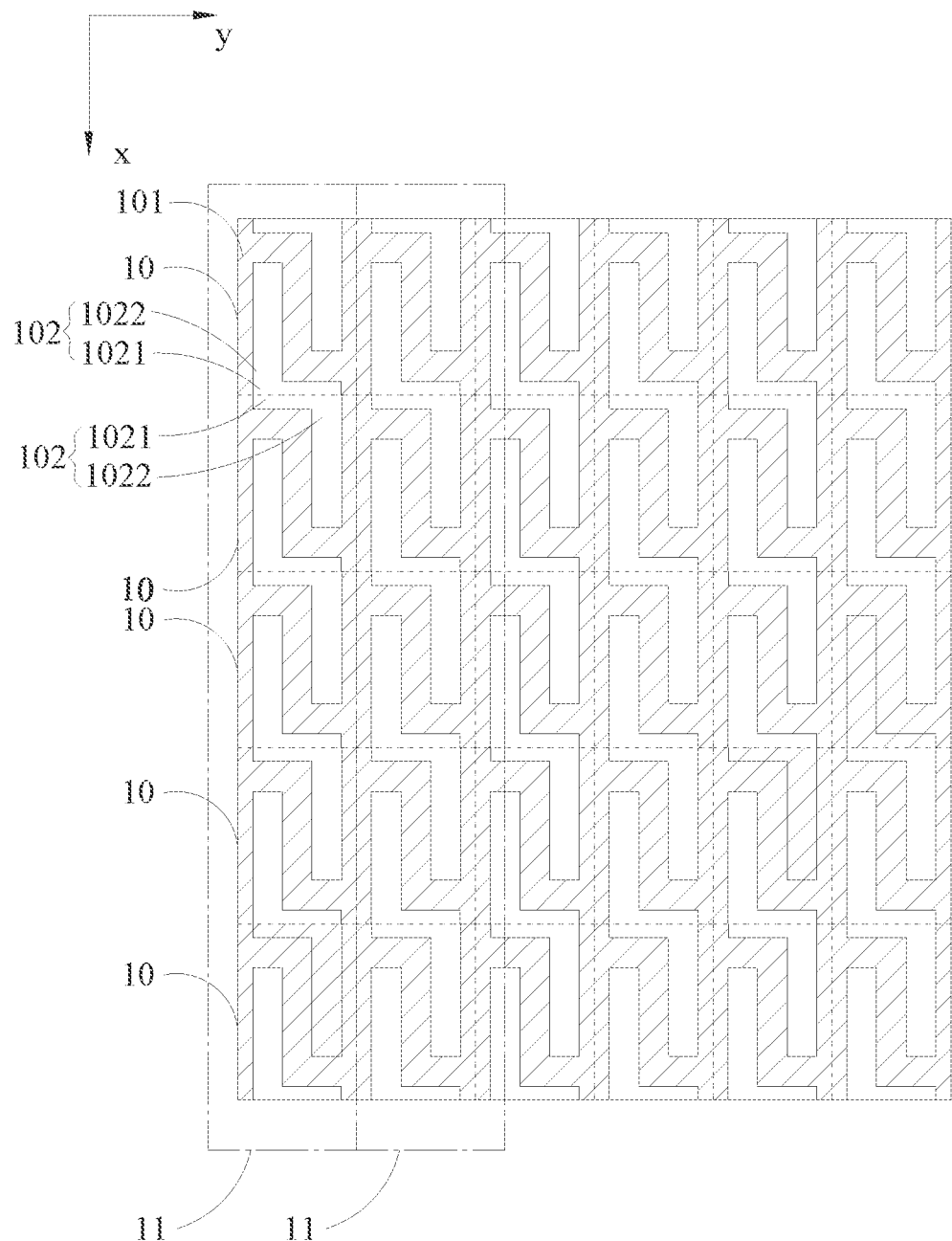
FIG. 12 is a schematic structural view of a bending region in another support plate provided by an embodiment of the present application.

FIG. 12 is a schematic structural view of the bending region in another support plate provided by an embodiment of the present application.

As shown in FIG. 12, when the shape of the two adjacent stress-releasing holes 102 in the first direction x is Z-shaped in the thickness direction of the support bodies 101, in the second direction y, two adjacent Z-shapes are arranged in a same direction. According to this arrangement, in any two adjacent Z-shapes in the second direction y, the distances between the two first sub-sections 1021 arranged in the second direction y are the same, so that the Z-shaped distribution in the bending region W can be more uniform, and the stress distribution in the bending region W can be more uniform.

When the shape of the two adjacent stress-releasing holes 102 in the first direction x is other shapes in the thickness direction of the support bodies 101, the above arrangement can also be applicable, which is not particularly restricted in the present application.

Figure 13:
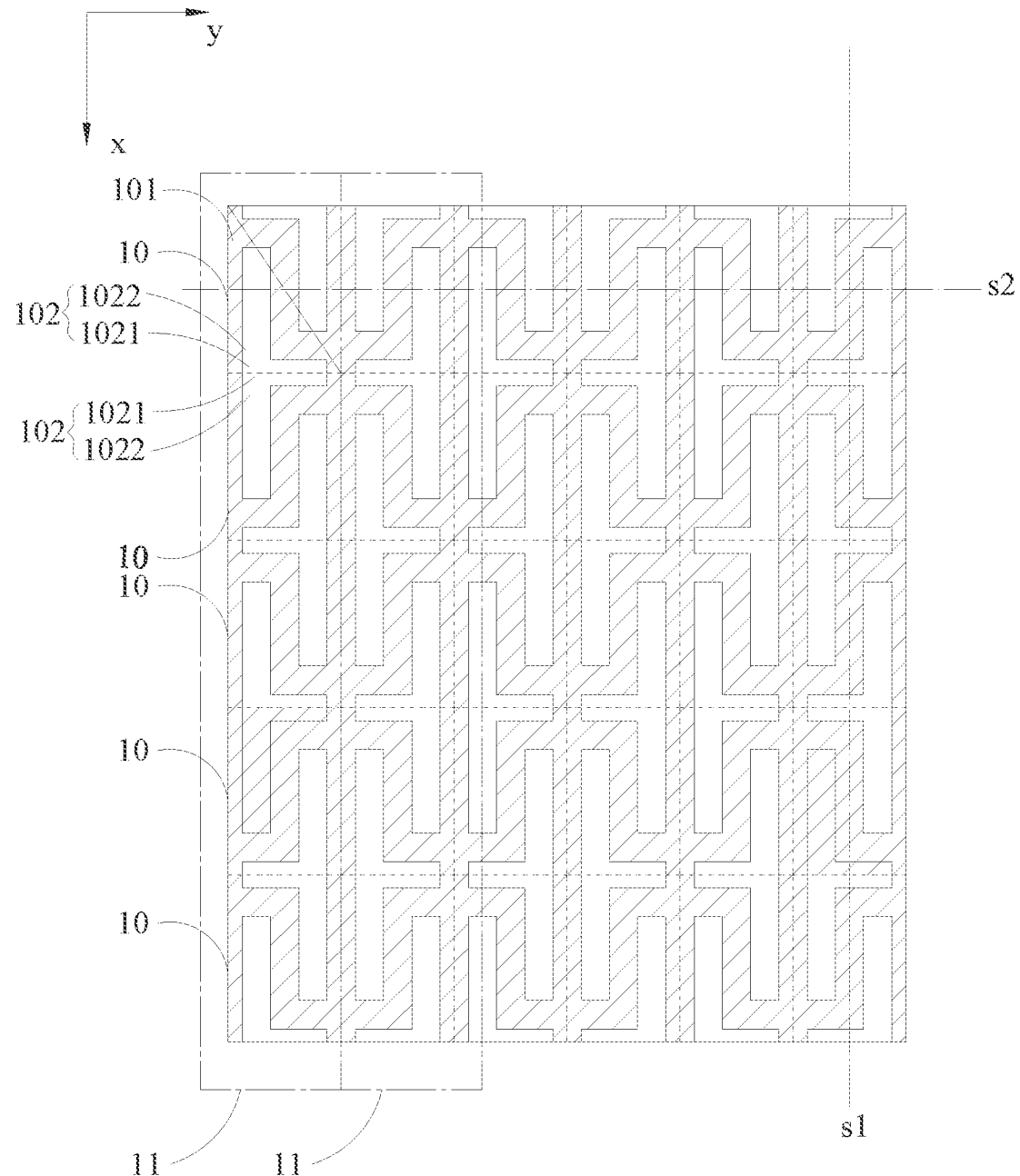
FIG. 13 is a schematic structural view of a bending region in another support plate provided by an embodiment of the present application.

FIG. 13 is a schematic structural view of the bending region in another support plate provided by an embodiment of the present application.

Specifically, as shown in FIG. 13, when the shape of the two adjacent stress-releasing holes 102 in the first direction x is T-shaped in the thickness direction of the support bodies 101, in the second direction y, two adjacent T-shapes are arranged in opposite directions. Therefore, on the premise of ensuring an area ratio of the stress-releasing holes 102 to the repeating units 10, more arrangements of the stress-releasing holes 102 can be provided; at the same time, the arrangement can realize both the support performance and the bending performance of the bending region W.

In another feasible embodiment, as shown in FIG. 13, the bending region W includes a plurality of repeating unit groups 11, and the repeating unit group 11 includes the plurality of the repeating units 10 arranged in the first direction x. The adjacent repeating unit groups 11 in the second direction y are symmetrically distributed in the first direction x. According to the above arrangement, the two repeating unit groups 11 in the bending region W is regularly arranged as a group, and the stress can be released relatively uniformly in the bending region W.

Figure 14:
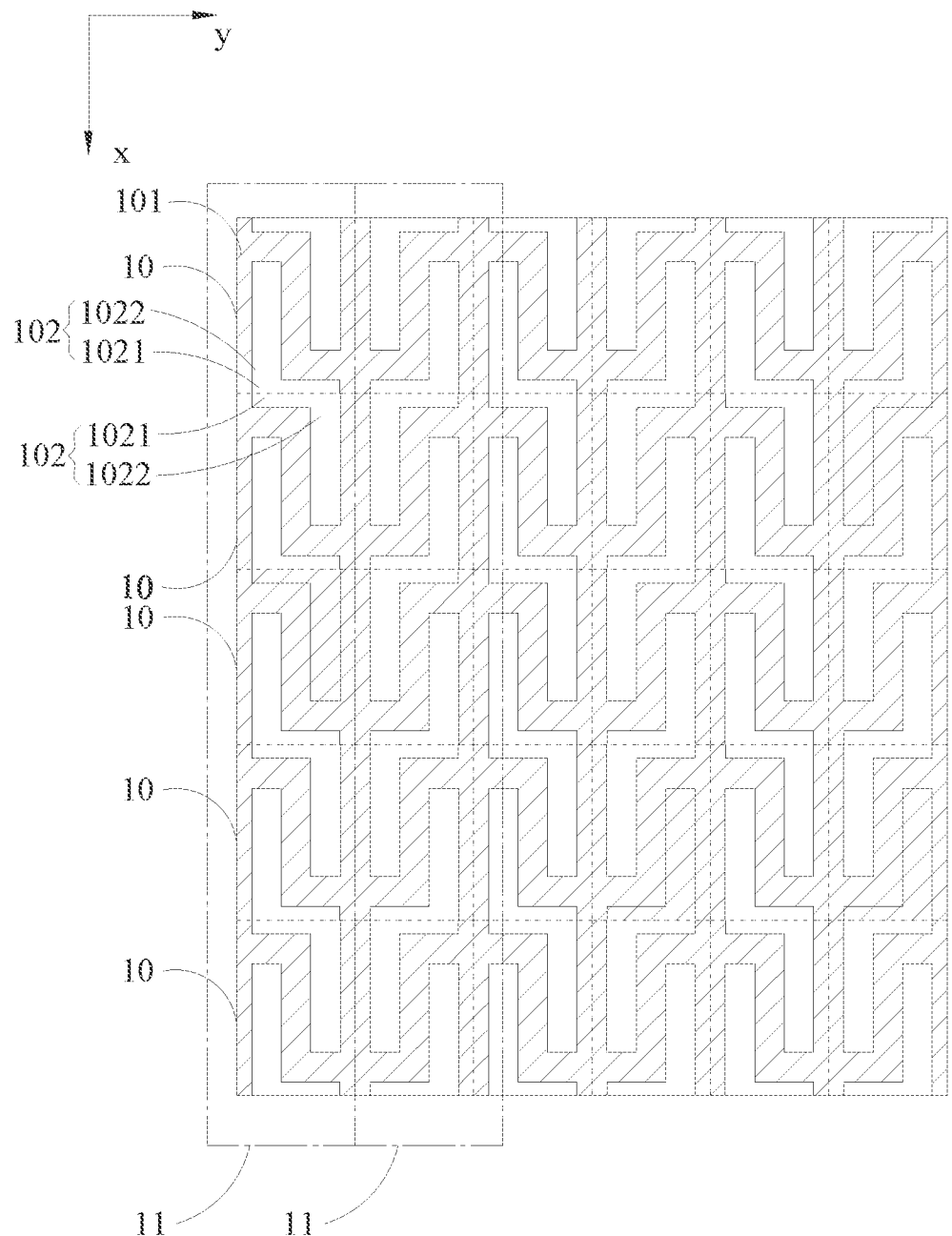
FIG. 14 is a schematic structural view of a bending region in another support plate provided by an embodiment of the present application.

FIG. 14 is a schematic structural view of the bending region in another support plate provided by an embodiment of the present application.

As shown in FIG. 14, when the shape of the two adjacent stress-releasing holes 102 in the first direction x is Z-shaped in the thickness direction of the support bodies 101, in the second direction y, two adjacent Z-shapes are arranged in opposite directions. Therefore, on the premise of ensuring an area ratio of the stress-releasing holes 102 to the repeating units 10, more arrangements of the stress-releasing holes 102 can be provided; at the same time, the arrangement can realize both the support performance and the bending performance of the bending region W.

When the shape of the two adjacent stress-releasing holes 102 in the first direction x is other shapes in the thickness direction of the support bodies 101, the above arrangement can also be applicable, which is not particularly restricted in the present application.

In a feasible embodiment, as shown in FIG. 13 and FIG. 14, the plurality of the repeating units 10 are arranged in an array, a line s1 connecting centers of the plurality of the repeating units arranged in the first direction x is parallel to the first direction x, and a line s2 connecting centers of the plurality of the repeating units 10 arranged in the second direction y is parallel to the second direction y.

In the above embodiment, the plurality of repeating units 10 are arranged in rows and columns, that is, in an array arrangement, so that the multiple repeating units 10 are arranged in rows and columns, so that the arrangement of the repeating units 10 in the bending region W can be more regular in row and column directions, the stress can release more uniformly in the bending region W, and it is facilitated to manufacture the bending region W.

Figure 15:
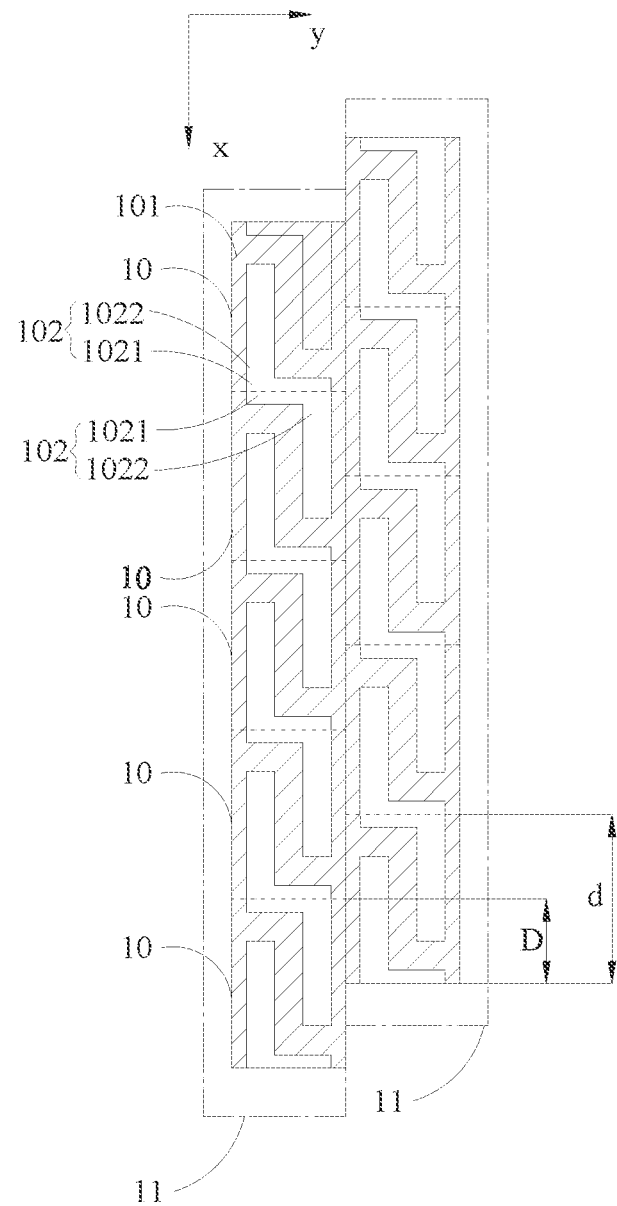
FIG. 15 is a partial schematic structural view of a bending region in another support plate provided by an embodiment of the present application.

FIG. 15 is a partial schematic structural view of the bending region in another support plate provided by an embodiment of the present application.

In another feasible embodiment, as shown in FIG. 15, the bending region W includes the plurality of repeating unit groups 11, and the repeating unit group 11 includes the plurality of the repeating units 10 arranged in the first direction x. The plurality of repeating unit groups 11 are arranged in the second direction y, at least two adjacent repeating unit groups 11 in the second direction y are deviated by a preset distance D in the first direction x, 0<D<d, in which the d is a length of the repeating unit 10 in the first direction x.

In the above embodiment, the adjacent two repeating unit groups 11 in the second direction y are arranged to be deviated in the first direction x, thus, the two stress-releasing holes 102 located in the adjacent repeating unit groups 11 and adjacent to each other in the second direction y are arranged to be deviated. Since the stress-releasing holes 102, which are arranged to be deviated, are affected by the material strength of unopened parts (support body 101) adjacent to the stress-releasing holes, after the bending force disappears, stretched portions in the middle of the stress-releasing holes 102 can recover faster, so that the support plate 1 has the good capability to recover and deform, so as to provide the flatter support for the flexible display panel, therefore, the flatness of the flexible display panel can be ensured after a flattened state is restored.

Figure 16:
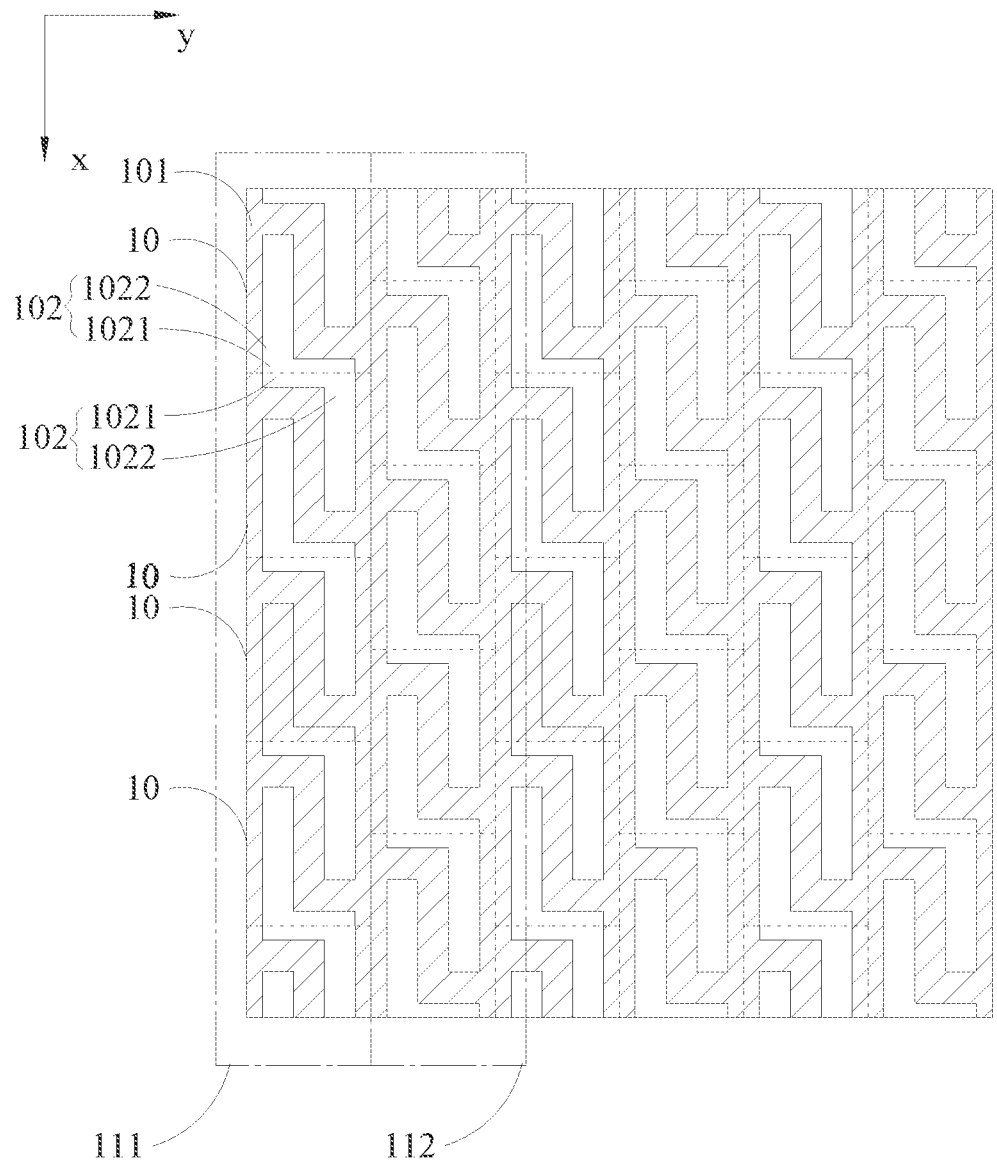
FIG. 16 is a schematic structural view of a bending region in another support plate provided by an embodiment of the present application.

FIG. 16 is a schematic structural view of the bending region in another support plate provided by an embodiment of the present application.

In a feasible embodiment, as shown in FIG. 16, the repeating unit groups 11 include first repeating unit groups 111 and second repeating unit groups 112 that are alternately arranged in the second direction y, and in the first direction x, the second repeating unit groups 112 are deviated from the first repeating unit groups 111.

Optionally, the first repeating unit groups 111 may be in odd-numbered columns, and the second repeating unit groups 112 may be in even-numbered columns. The first repeating unit groups 111 and the second repeating unit groups 112 are arranged to be deviated in the first direction x. The first repeating unit groups 111 and the second repeating unit groups 112 are alternately arranged in the second direction y, so that in the bending region W, the odd-numbered columns are sequentially arranged in the second direction y, and are not deviated in the first direction x. The even-numbered columns are sequentially arranged in the second direction y, and are not deviated in the first direction x. The odd-numbered columns and the even-numbered columns are arranged in the second direction y, and are arranged to be deviated in the first direction x. Therefore, under the premise of the deviation arrangement to ensure the capability of the stress-releasing holes 102 to return to an original state, the stress-releasing holes 102 in the entire bending region W can be distributed relatively uniformly, so as to avoid the stress concentration in the bending region W, and improve the bending performance of the bending region W.

Optionally, in other embodiments, the first repeating unit groups 111 may be in the even-numbered columns, and the second repeating unit groups 112 may be in the odd-numbered columns, which are not restricted in the present application.

In a feasible embodiment, as shown in FIG. 16, a shape of a projection of the first sub-section 1021 in a thickness direction of the support body 101 may be a rectangle, and/or a shape of a projection of the second sub-section 1022 in a thickness direction of the support body 101 may be a rectangle.

In the above embodiment, the shape of the projection of the first sub-section 1021 and/or the second sub-section 1022 in the thickness direction of the support body 101 can be arranged to be the rectangle, which can facilitate to manufacture. At the same time, the stress-releasing requirements can be met better by an extension direction of the rectangle during the bending process. In addition, an edge of the rectangle is straight, so as to reduce a sharp corner and prevent region with the stress concentration.

Figure 17:
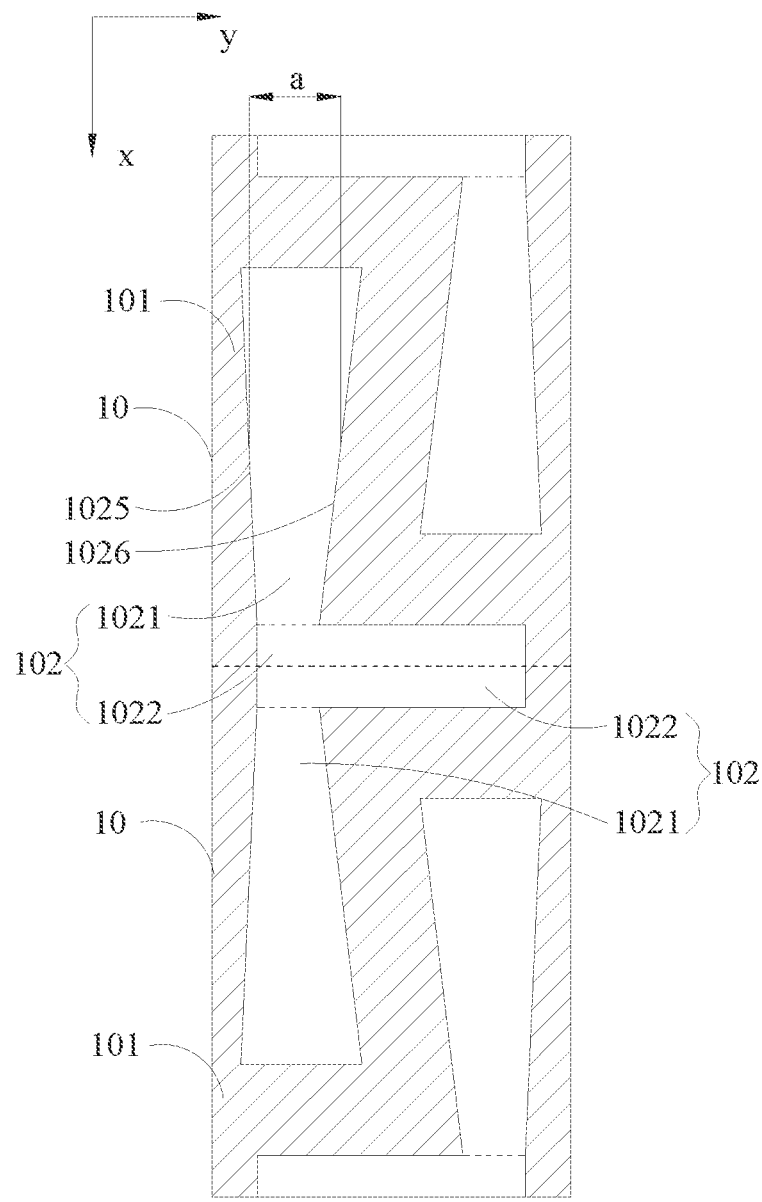
FIG. 17 shows a schematic structural view of another support plate provided by an embodiment of the present application.
Figure 18:
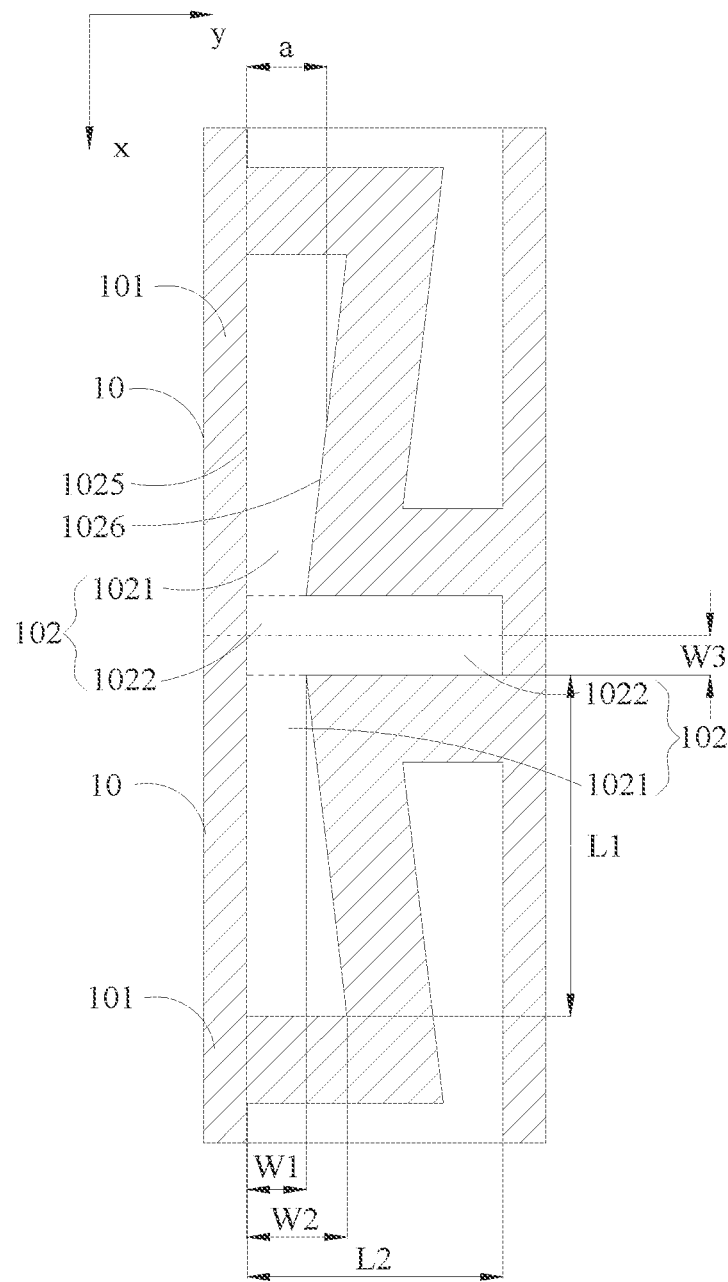
FIG. 18 shows a schematic structural view of another support plate provided by an embodiment of the present application.

FIG. 17 shows a schematic structural view of another support plate provided by an embodiment of the present application, and FIG. 18 shows a schematic structural view of another support plate provided by an embodiment of the present application.

In a feasible embodiment, as shown in FIG. 17 and FIG. 18, the shape of the projection of the first sub-section 1021 in the thickness direction of the support body 101 may be a trapezoid, and/or the shape of the projection of the second sub-section 1022 in the thickness direction of the support body 101 may be the rectangle.

In the above embodiment, when the shape of the projection of the first sub-section 1021 in the thickness direction of the support body 101 is the trapezoid, the shape can be a right-angled trapezoid, an isosceles trapezoid, other irregular trapezoids or the like, which is not particularly restricted in the present application. Specifically, a high line of the trapezoid may be in the first direction x, so as to maintain the first sub-section 1021 extending in the first direction x and the communication between the first sub-section 1021 and the second sub-section 1022.

In the above embodiment, the shape of the projection of the first sub-section 1021 in the thickness direction of the support body 101 is the trapezoid, so as to be arranged by the trapezoid, so that in each of the repeating units 10, the region of the support body 101 between the two stress-releasing holes 102 is in an inclined arrangement state. During the bending process, when the bending region W is subjected to the tensile force in the bending direction (around the first direction x), since the region of the support body 101 between the two stress-releasing holes 102 is in the inclined arrangement state, the region of the support body 101 arranged to be inclined resists the tensile force during a stretching process, so that the bending area W approaches the first direction x under an action of the tensile force firstly. In the process, the shrinkage of the bending region W in the first direction x can be reduced, and on the premise of ensuring the bending performance, the support effect of the bending region W of the support plate 1 can be improved during the bending process.

In a feasible embodiment, as shown in FIG. 18, the first sub-section 1021 includes a first side edge 1025 and a second side edge 1026 arranged in the second direction; in the stress-releasing holes 102, in the second direction y, a distance between the first side edge 1025 and the second side edge 1026 is a; in a direction from approaching the second sub-section 1022 to being away from the second sub-section 1022, the a gradually increases.

In the above embodiment, in the two stress-releasing holes 102 communicated with each other in the first direction x, the capability of releasing stress in each part are more balanced. Since the two stress-releasing holes 102 communicated with each other in the first direction x can be communicated by the second sub-section 1022, in a middle position in the first direction x of the two stress-releasing holes 102 communicated with each other in the first direction x, the second sub-section 1022 has a larger area, so that the capability of releasing stress at each position in the first direction x tends to be balanced, so that the capability of releasing stress can be better.

In a feasible embodiment, as shown in FIG. 18, a maximum length of the first sub-section 1021 in the first direction x is L1, a maximum length of the second sub-section 1022 in the second direction y is L2, and L1>L2.

A minimum length of the first sub-section 1021 in the second direction y is W1, a maximum length of the first sub-section 1021 in the second direction y is W2, a length of the second sub-section 1022 in the first direction x is W3, and W1≤2·W3≤W2.

During the bending process, the bending region W is bent around the first direction x, so that stress exists in the direction around the first direction x; the first sub-section 1021 extends in the first direction x, so that the extrusion stress of the part located at the bending inner side in the extrusion process can be released during the bending process; the maximum length of the first sub-section 1021 in the first direction x can be arranged to be larger, so that the range of the first sub-section 1021 perpendicular to the direction of the extrusion stress can be increased, and the releasing stress effect on the extrusion stress can be improved. The second sub-section 1022 extends in the second direction y, and the second direction y is the bending direction when the bending region W is bent, so that the second sub-section 1022 can bear more releasing stress effect in the bending direction c. The second sub-section 1022 can be arranged to be smaller, which can improve the support performance of the bending region W, so that the bending performance of the bending region W can be better, while taking into account the support performance.

Figure 19:
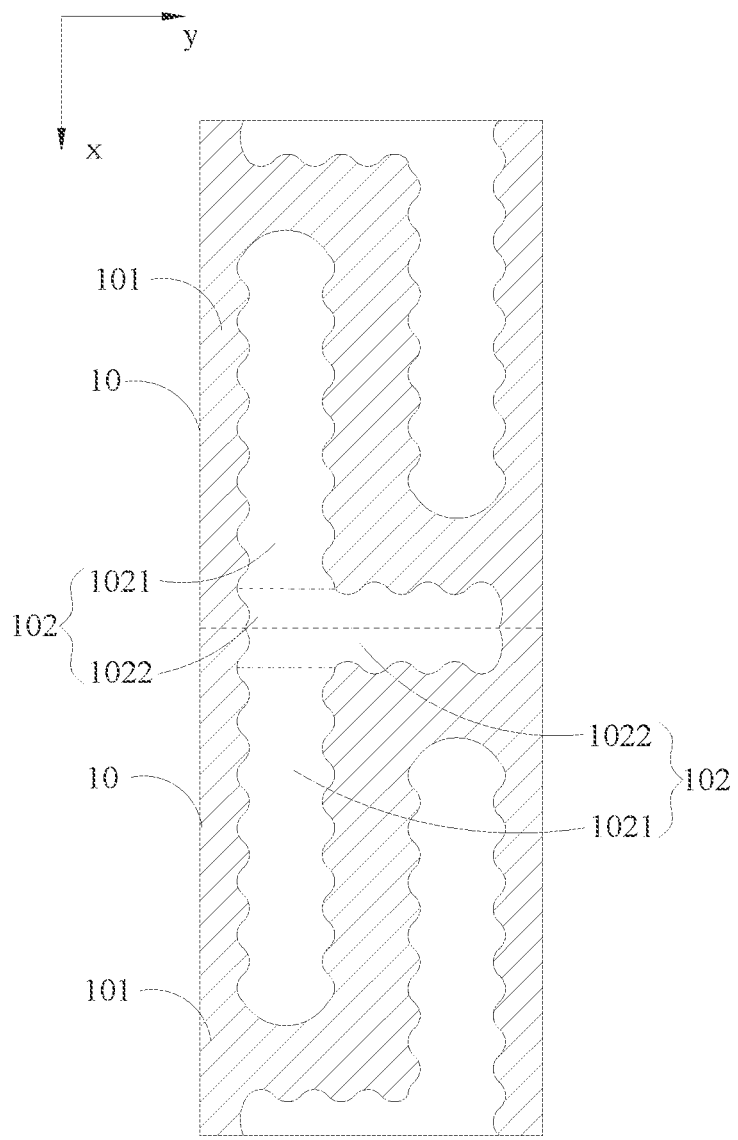
FIG. 19 shows a schematic structural view of another support plate provided by an embodiment of the present application.

FIG. 19 shows a schematic structural view of another support plate provided by an embodiment of the present application.

In a feasible embodiment, as shown in FIG. 19, an edge of a projection of the first sub-section 1021 in the thickness direction of the support body 101 is wavy-shaped, and/or an edge of a projection of the second sub-section 1022 in the thickness direction of the support body 101 is wavy-shaped.

In the above embodiment, the edge of the projection of the first sub-section 1021 and/or the second sub-section 1022 in the thickness direction of the support body 101 is wavy-shaped, so that the possibility of appearing the sharp corner in the edge of the first sub-section 1021 and/or the second sub-section 1022 can be reduced, the possibility of stress concentration in the region at the sharp corner due to appearing the sharp corner can be reduced, the stress concentration region of the bending region W can be further reduced, and the bending performance of the bending region W can be further improved.

Figure 20:
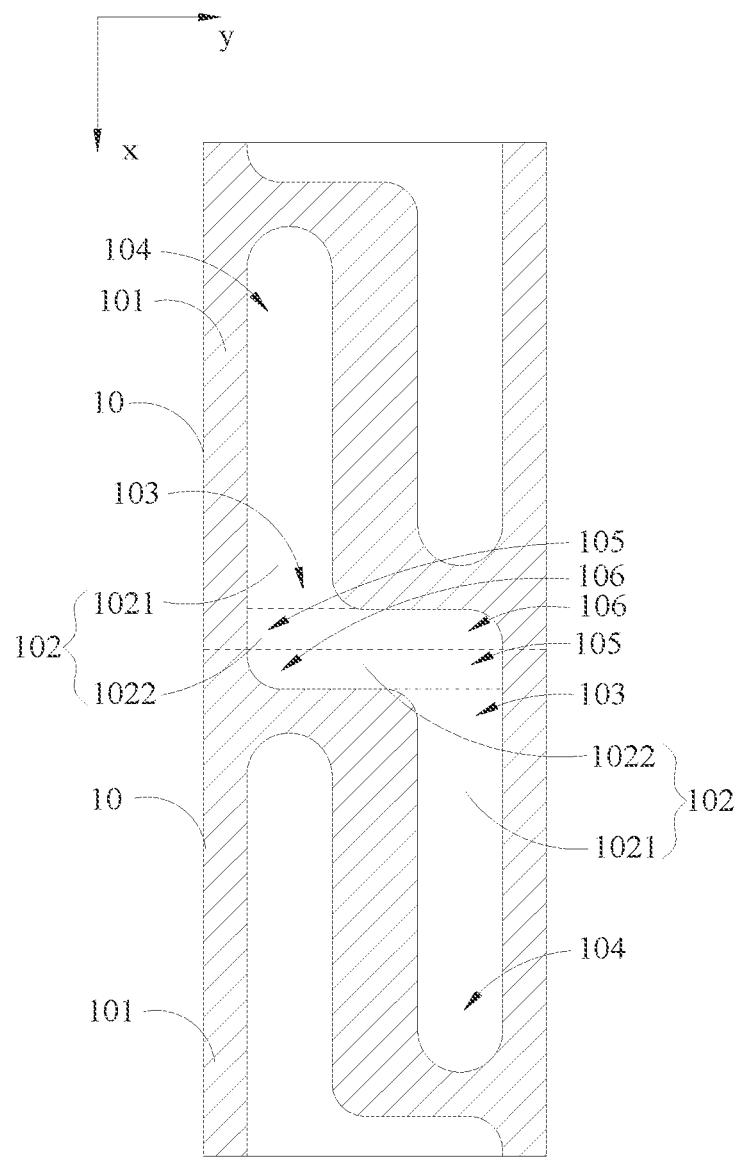
FIG. 20 shows a schematic structural view of another support plate provided by an embodiment of the present application.

FIG. 20 shows a schematic structural view of another support plate provided by an embodiment of the present application.

In a feasible embodiment, as shown in FIG. 20, the projection of the first sub-section 1021 in the thickness direction of the support body 101 includes two straight-line edges arranged in the first direction x and an arc-shaped edge located between the two straight-line edges, and/or the second sub-section 1022 includes a first straight-line edge and a second straight-line edge arranged in the first direction x, the first straight-line edge and the first sub-section 1021 are connected by an arc-shaped edge, and the first straight-line edge and the second straight-line edge are connected by the arc-shaped edge at a side away from the first sub-section 1021.

In the above embodiment, the transition between the two straight-line edges can be realized by the arc-shaped edge, so that the problem of stress concentration can be reduced, and the bending performance and the support performance in the bending region of the support plate 1 can be better.

Figure 21:
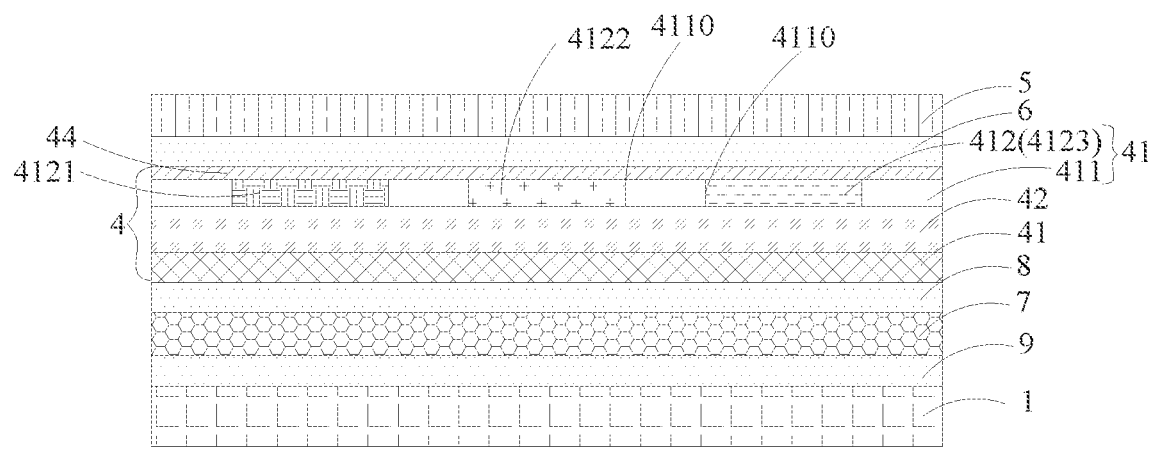
FIG. 21 shows a cross-sectional view of a display module provided by an embodiment of the present application.

FIG. 21 shows a cross-sectional view of a display module provided by an embodiment of the present application.

As shown in FIG. 21, the present application further provides the display module 2, including a flexible display panel 4 and the support plate 1 according to any one of the above embodiments of the present application. The support plate 1 is arranged at a side of the flexible display panel 4 away from a light-emitting face.

In the display module 2 provided in the present application, an OLED flexible display panel can be used as an example for illustration. The flexible display panel 4 may also be other types of flexible display panels 4, which is not particularly restricted in the present application.

In the case that the flexible display panel 4 is an OLED display panel, the flexible display panel includes a substrate base 41, a driving circuit layer 42 on the substrate base 41, a light-emitting device layer 43 at a side of the driving circuit layer 42 away from the substrate base 41, a packaging layer 44 at a side of the light-emitting device layer 43 away from the substrate base 41 and the like. The light-emitting device layer 41 includes a pixel defining layer 411 having a pixel opening 4110, and a light-emitting unit 412 located within the pixel opening. The light-emitting unit 412 includes a red light-emitting unit 4121, a green light-emitting unit 4122 and a blue light-emitting unit 4123, and may also include a white light-emitting unit and the like, which is not particularly restricted in the present application.

The display module 2 provided in the present application further includes a flexible cover plate 5 located at a side of the light-emitting face of the flexible display panel 4. The flexible display panel 4 and the flexible cover plate 5 are bonded and fixed by the first bonding layer 6. The display module 2 further includes a buffering layer 7 located at the side of the flexible display panel 4 away from the light-emitting face. The buffering layer 7 and the flexible display panel 4 are bonded and fixed by a second bonding layer 8. The support plate 1 is located at a side of the buffering layer 7 away from the flexible display panel 4, and the support plate 1 and the buffer layer 7 are bonded and fixed by a third bonding layer 9.

In the above display module 2, since the flexible display panel 4 may have creases and the like during the curving and bending process, the flatness may be not good. A solution that the support plate 1 is arranged at the side of the flexible display panel 4 away from the light-emitting face can provide support for the flexible display panel 4 so as to improve the flatness of the flexible display panel 4. The above display module 2 adopts any one of the support plates 1 provided in the above embodiments of the present application. The bending region W of the support plate 1 can take into account both the bending performance and the support performance, so that in the bending process, the difficulty of bending can be reduced, and the rebound after bending can be prevented, at the same time the support performance is higher, so that the flatness of the flexible display panel 4 can be improved during and after bending. Thus, the display module 2 can achieve good bending and unfolding, the performance can be better, and the user experience can also be better.

Figure 22:
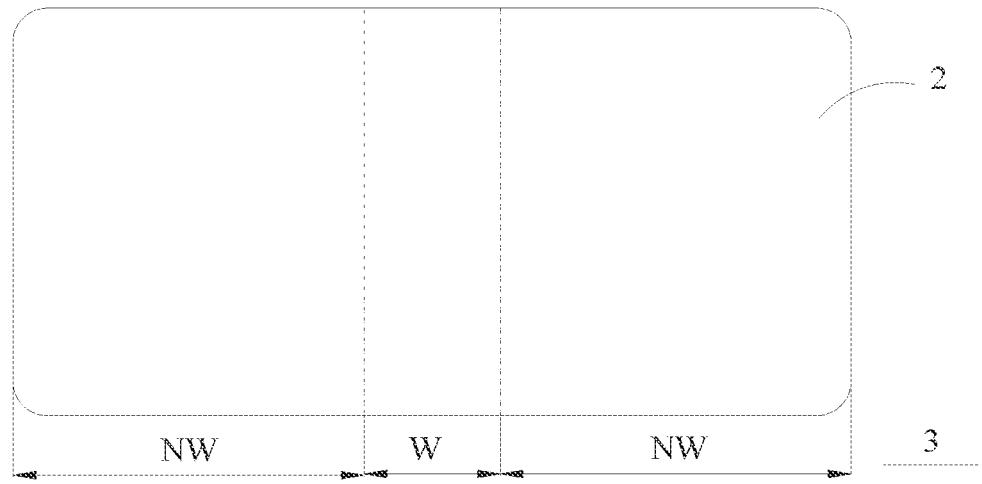
FIG. 22 is a top view of a display device provided by an embodiment of the present application.

FIG. 22 is a top view of a display device provided by an embodiment of the present application.

As shown in FIG. 22, the present application also provides the display device 3, including the display module 2 provided by the present application.

The display device 3 may be a mobile terminal such as a mobile phone and a tablet computer, or a fixed terminal such as a monitor or a TV, or a vehicle-mounted display screen or a wearable device, which is not particularly restricted in the present application. The display device 3 can be bent, so that it can be unfolded during use to increase the display area; the display device can also be folded and stored after use to reduce a storage space, so that it can be easy to carry and so on, and the user experience can be better.

In accordance with the present application such as the above embodiments, these embodiments do not exhaustively describe all the details, nor do they restrict the invention to only specific embodiments. Obviously, many modifications and variations can be made according to the above description. The description selects and specifically describes these embodiments in order to better explain the principles and practical applications of the present application, so that those skilled in the art can make good use of the present application and modifications based on the present application. The present application is to be limited only by the claims, along with their full scope and equivalents.

What is claimed is:

1. A support plate, comprising
a bending region, wherein the bending region can be bent around a first direction, the bending region comprises a plurality of repeating units, the repeating unit comprises a support body and two stress-releasing holes formed in the support body, and the two stress-releasing holes are arranged to be spaced from each other;
in the same repeating unit, each of the two stress-releasing holes is L-shaped, angles of the two stress-releasing holes are arranged opposite to each other, a part of the support body located between the two L-shaped stress-releasing holes is Z-shaped;
each of the two stress-releasing holes in the same repeating unit comprises a first sub-section extending in the first direction and a second sub-section extending in a second direction, and the first direction and the second direction intersect with each other; the first sub-section comprises a first end and a second end, the second sub-section comprises a third end and a fourth end, and the first end of each of the stress-releasing holes communicates with the third end of the second sub-section.

2. The support plate according to claim 1, wherein the stress-releasing holes comprise blind holes and/or through holes.

3. The support plate according to claim 1, wherein in the same repeating unit, projections of two first sub-sections in the second direction at least partially overlap with each other, and/or projections of two second sub-sections in the first direction at least partially overlap with each other.

4. The support plate according to claim 1, wherein the support bodies of the plurality of repeating units in the bending region are arranged continuously, in at least two adjacent repeating units in the first direction, one of the stress-releasing holes in one of the repeating units communicates with one of the stress-releasing holes in another repeating unit.

5. The support plate according to claim 4, wherein edges of the second sub-sections of the two stress-releasing holes communicating with each other in the first direction at least partially overlap with each other.

6. The support plate according to claim 4, wherein in a thickness direction of the support bodies, a shape of the two stress-releasing holes communicating with each other in the first direction is a T-shape;
in the second direction, two adjacent T-shapes are arranged in a same direction or in opposite directions.

7. The support plate according to claim 4, wherein in a thickness direction of the support bodies, a shape of the two stress-releasing holes communicating with each other in the first direction is a Z-shape;
in the second direction, two adjacent Z-shapes are arranged in a same direction or in opposite directions.

8. The support plate according to claim 1, wherein the plurality of the repeating units are arranged in an array, a line connecting centers of the plurality of the repeating units arranged in the first direction is parallel to the first direction, and a line connecting centers of the plurality of the repeating units arranged in the second direction is parallel to the second direction.

9. The support plate according to claim 1, wherein the bending region comprises a plurality of repeating unit groups, and the repeating unit group comprises the plurality of the repeating units arranged in the first direction;
the plurality of repeating unit groups are arranged in the second direction, at least two adjacent repeating unit groups in the second direction are deviated by a preset distance D in the first direction, 0<D<d, wherein the d is a length of the repeating unit in the first direction.

10. The support plate according to claim 9, wherein the repeating unit group comprises a first repeating unit group and a second repeating unit group that are alternately arranged in the second direction, and in the first direction, the second repeating unit group is deviated from the first repeating unit group.

11. The support plate according to claim 1, wherein a shape of a projection of the first sub-section in a thickness direction of the support body is a rectangle, and/or a shape of a projection of the second sub-section in a thickness direction of the support body is a rectangle.

12. The support plate according to claim 1, wherein a shape of a projection of the first sub-section in a thickness direction of the support body is a trapezoid, and/or a shape of a projection of the second sub-section in a thickness direction of the support body is a rectangle.

13. The support plate according to claim 12, wherein the first sub-section comprises a first side edge and a second side edge arranged in the second direction; in the stress-releasing holes, in the second direction, a distance between the first side edge and the second side edge is a; in a direction from approaching the second sub-section to being away from the second sub-section, the a gradually increases.

14. The support plate according to claim 1, wherein a maximum length of the first sub-section in the first direction is L1, a maximum length of the second sub-section in the second direction is L2, and L1>L2;
a minimum length of the first sub-section in the second direction is W1, a maximum length of the first sub-section in the second direction is W2, a length of the second sub-section in the first direction is W3, and $W1 \leq 2 \cdot W3 \leq W2$.

15. The support plate according to claim 1, wherein an edge of a projection of the first sub-section in a thickness direction of the support body is wavy-shaped, and/or an edge of a projection of the second sub-section in a thickness direction of the support body is wavy-shaped.

16. The support plate according to claim 1, wherein a projection of the first sub-section in a thickness direction of the support body comprises two straight-line edges arranged in the first direction and an arc-shaped edge located between the two straight-line edges, and/or the second sub-section comprises a first straight-line edge and a second straight-line edge arranged in the first direction, the first straight-line edge and the first sub-section are connected by an arc-shaped edge, and the first straight-line edge and the second straight-line edge are connected by the arc-shaped edge at a side away from the first sub-section.

17. A display module, comprising a flexible display panel and a support plate, wherein the support plate is arranged at a side of the flexible display panel away from a light-emitting face;
the support plate comprises a bending region, the bending region can be bent around a first direction, the bending region comprises a plurality of repeating units, the repeating unit comprises a support body and two stress-releasing holes formed in the support body, and the two stress-releasing holes are arranged to be spaced from each other;
in the same repeating unit, each of the two stress-releasing holes is L-shaped, angles of the two stress-releasing holes are arranged opposite to each other, and a part of the support body located between the two L-shaped stress-releasing holes is Z-shaped;
each of the two stress-releasing holes in the same repeating unit comprises a first sub-section extending in the first direction and a second sub-section extending in a second direction, and the first direction and the second direction intersect with each other; the first sub-section comprises a first end and a second end, the second sub-section comprises a third end and a fourth end, and the first end of each of the stress-releasing holes communicates with the third end of the second sub-section.

18. A display device, comprising a display module;
wherein the display module comprises a flexible display panel and a support plate, the support plate is arranged at a side of the flexible display panel away from a light-emitting face;
the support plate comprises a bending region, the bending region can be bent around a first direction, the bending region comprises a plurality of repeating units, the repeating unit comprises a support body and two stress-releasing holes formed in the support body, and the two stress-releasing holes are arranged to be spaced from each other;
in the same repeating unit, each of the two stress-releasing holes is L-shaped, angles of the two stress-releasing holes are arranged opposite to each other, and a part of the support body located between the two L-shaped stress-releasing holes is Z-shaped;
each of the two stress-releasing holes in the same repeating unit comprises a first sub-section extending in the first direction and a second sub-section extending in a second direction, and the first direction and the second direction intersect with each other; the first sub-section comprises a first end and a second end, the second sub-section comprises a third end and a fourth end, and the first end of each of the stress-releasing holes communicates with the third end of the second sub-section.

* * * * *